United States Patent
Ferreira Da Silva

(12) 
(10) Patent No.: US 12,441,932 B2
(45) Date of Patent: Oct. 14, 2025

(54) CALCITE IMPREGNATED WITH SCALE INHIBITOR COMPOSITION, PROCESS OF OBTAINING THE SAME AND PROCESS FOR COMBATING CIRCULATION LOSS

(71) Applicant: PETRÓLEO BRASILEIRO S.A.—PETROBRAS, Rio de Janeiro (BR)

(72) Inventor: Mario Germino Ferreira Da Silva, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/481,040

(22) Filed: Oct. 4, 2023

(65) Prior Publication Data

US 2024/0117241 A1 Apr. 11, 2024

(30) Foreign Application Priority Data

Oct. 7, 2022 (BR) .................. 10 2022 020375 0

(51) Int. Cl.
*C09K 8/588* (2006.01)

(52) U.S. Cl.
CPC .................. *C09K 8/588* (2013.01)

(58) Field of Classification Search
CPC ............ C09K 8/588; C09K 8/58; E21B 43/27
See application file for complete search history.

(56) References Cited

U.S. PATENT DOCUMENTS

| | | | | |
|---|---|---|---|---|
| 2003/0114314 A1* | 6/2003 | Ballard | .................. | C09K 8/536 507/100 |
| 2008/0039347 A1* | 2/2008 | Welton | ..................... | C09K 8/08 507/213 |
| 2009/0025933 A1* | 1/2009 | Garcia-Lopez de Victoria | ........... | C09K 8/74 507/221 |
| 2010/0081586 A1* | 4/2010 | Smith | ...................... | C09K 8/90 507/224 |
| 2014/0135237 A1* | 5/2014 | Villarreal, Jr. | ......... | C09K 8/516 507/119 |
| 2017/0045490 A1* | 2/2017 | Irani | ...................... | E21B 49/08 |
| 2018/0298266 A1* | 10/2018 | Marr | ....................... | C09K 8/00 |
| 2018/0298274 A1* | 10/2018 | Zhao | ..................... | C09K 8/588 |
| 2019/0316024 A1* | 10/2019 | Prakash | ................... | C09K 8/68 |

OTHER PUBLICATIONS

Li, An, et al. "Effects of chemical inhibitors on the scaling behaviors of calcite and the associated surface interaction mechanisms." *Journal of Colloid and Interface Science* 618 (2022): 507-517.
Li, Zhenxuan, et al. "Comparative study of carboxylic acid adsorption on calcite: l-malic acid, d-malic acid and succinic acid." *Carbonates and Evaporites* 34 (2019): 1131-1139.
Souza, A. L. S., et al. "Water management in petrobras: developments and challenges." *Offshore Technology Conference*. OTC, 2005.

\* cited by examiner

*Primary Examiner* — Silvana C Runyan
(74) *Attorney, Agent, or Firm* — Knobbe Martens Olson & Bear LLP

(57) ABSTRACT

The present invention describes a composition that comprises viscous mattresses and calcite impregnated with scale inhibitors. In a second embodiment, the present invention relates to the process of preparing said composition. In another embodiment, a process for combating the circulation loss including the application, within the reservoir, of said composition during the drilling a well, is disclosed.

14 Claims, 1 Drawing Sheet

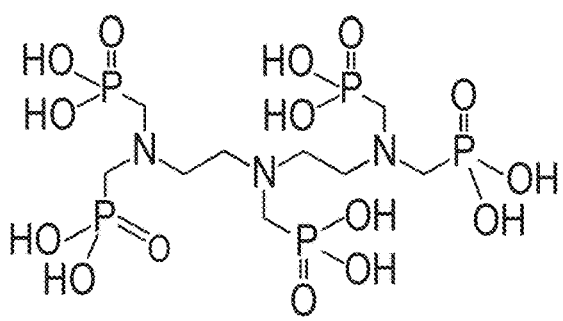
A
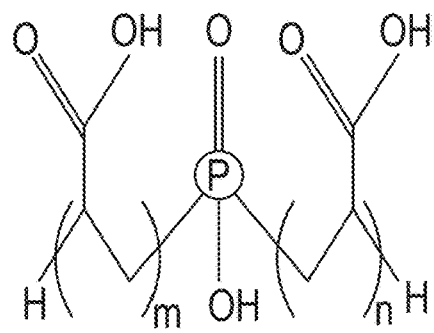
B
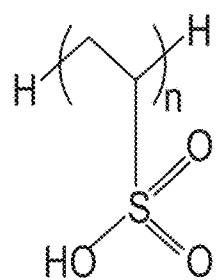
C
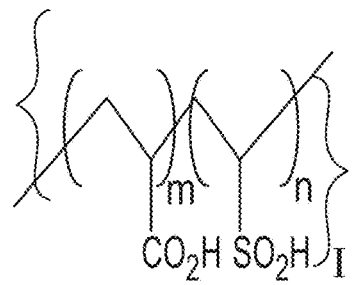
D
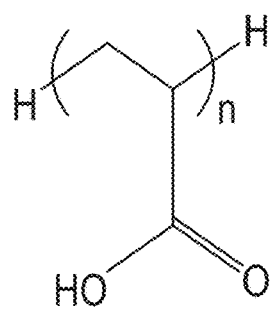
E
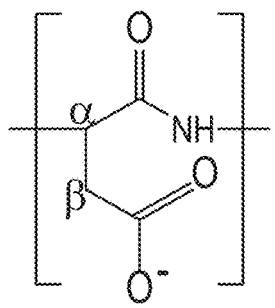
F
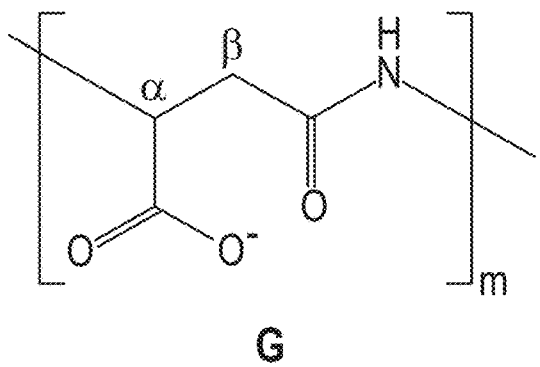
G
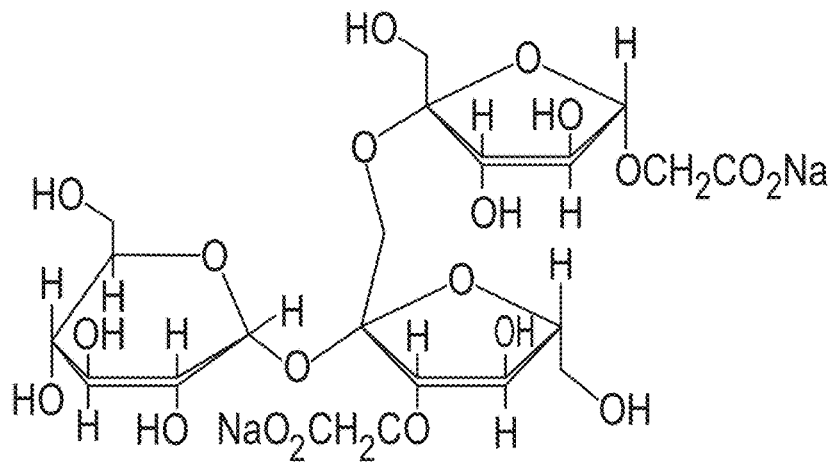
H

CALCITE IMPREGNATED WITH SCALE INHIBITOR COMPOSITION, PROCESS OF OBTAINING THE SAME AND PROCESS FOR COMBATING CIRCULATION LOSS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to Brazilian Application No. BR 10 2022 020375 0, filed 7 Oct. 2022, the entire contents of which are hereby incorporated by reference.

FIELD OF THE INVENTION

The present invention falls within the technical field of oil production processes, more specifically, in area of compositions for drilling and well treatment.

The present invention relates to a composition, process of obtaining the same and process for inhibiting scale in producing wells, with the aim of reducing or prevent circulation losses.

DESCRIPTION OF THE STATE OF THE ART

It is known that drilling an oil well is carried out using a probe. Due to a rotating action and applying weight to a drill at the end of a drill string—which consists of controls (thick-walled pipes) and drilling pipes (thin-walled pipes)—, the rocks are drilled, and their fragments are removed by the action of a drilling fluid or mud, which are injected by pumping into this string. Such fluid is injected by pumps into the drilling through the injection head, or swivel, and returns to the surface through the annular space formed between the well walls and column. Once a certain depth is reached, the drill string is withdrawn of the well and a steel casing string of diameter lower than the drill is lowered into the well. The ring between casing tubes and well walls are cemented with the purpose of isolating the crossed rocks, allowing the safe progress of the drilling. After the cementing operation, the drill string is lowered again into the well, having at its end a new drill of diameter smaller than that of the casing, thus continuing with the drilling. In this way, the well is drilled in several phases, characterized by different drill diameters.

During well drilling, the decrease in hydrostatic pressure created by circulation loss, combined with the drop in the fluid level in the well due to the entry of the drilling fluid into the formation, may allow fluid to enter from the formation into the well, which can lead to loss of well control, from a kick, which means influx of gas, water and/or oil, coming from the reservoir into the well during drilling until a blowout, which consists of an uncontrolled flow of hydrocarbons, gas or water escaping from an oil well due to some failure in its pressure control system.

In this way, circulation loss occurs due to the imbalance of hydrostatic pressures inside the well and the statics of the formation, especially when the rocks of the reservoirs have vugs, faults or high permeability.

To control these circulation losses, materials with viscous gels and material such as fine, medium and coarse calcite, are used to generate the plugging inside the reservoir. Aiming to control drilling fluid loss into the reservoir, as well as the loss of control of the oil well, sometimes it is necessary the pumping of several viscous mattresses.

When finishing drilling a well, it is necessary returning it to operating condition in a safe and economical way throughout its productive life. To the set of operations intended to equip the well to produce oil or gas (or still injecting fluids into the reservoirs) is called completion.

Regarding the technical and operational aspects, the production (or injection) flow must be optimized in a way to make completion as permanent as possible, that is, that minimizes the need for future interventions to well maintenance (so-called workover operations).

Considering that completion has consequences in the entire productive life of the well and involves high costs, careful planning of operations and a careful economic analysis are necessary.

In Brazil, most of the oil production comes from deposits located offshore, called offshore producing fields. To guarantee the flow of oil and gas from the deposit to the production units, which are generally platform ships for flow, engineers linked to production technology are constantly facing challenges related to marine environment. Among these challenges, the deeper and deeper sheets of water, the low temperatures on the seabed, the distance between wells producers and the maritime production unit (sometimes reaching 8 km), the heat exchange between production lines and the seabed environment and the precipitation of organic compounds, such as paraffins and asphaltenes, and inorganic, such as barium sulfate ($BaSO_4$), strontium sulfate ($SrSO_4$) and calcium carbonate ($CaCO_3$), within the submarine production, should be highlighted.

The development of the oil production of an oil field is a very complex process. After installation of the production system, as the field becomes producing, it is necessary to implement technologies that aim to maintain production at viable economic levels. Annually, millions of dollars are spent to correct the negative effects of the scale formation process in the production system, since their occurrence causes interruption of production and consequent reduction in field productivity, leading to loss of revenue that would be generated if there was no scale.

In order to guarantee the productivity of the oil field, sea water is injected into the reservoir, through injection wells, with the aim of maintaining the pressure of the drained reservoirs, replacing the removed mass, and also for the displacement of the oil towards to producing wells. The flow of injected seawater results in chemical interactions with the reservoir rock and the water originally present in the pores of the reservoir rock. Depending on the different chemical substances present in these waters, scale salts are formed, which is being deposited in the vicinity of the injection well, reaching the production well, subsea lines, production riser and Stationary Production Unit (SPU) production system. Scale removal treatments are carried out through the application of different methods, according to the type of scale formed, whether organic or inorganic in nature.

When deposits occur, organic solvents are used; in the case of paraffins diesel is used, while for asphaltenes xylene is used. When inorganic deposits occur, depending on the type of salt formed, polycarboxylic acid-based complexing chemical products, organic acids such as formic and acetic and inorganics such as hydrochloric acid, are used. Laboratory tests have demonstrated that the temperature promotes an increase in reaction yield.

The first production of a reservoir occurs through the action of its natural energy, which is called primary recovery. As oil is produced, a decline in reservoir pressure occurs. The reservoirs that are characterized by not having pressure enough to lift the oil to the surface tend to retain important amounts of hydrocarbons in its interior after the depletion of its energy. Due to this, when a production greater than that which would be obtained only through the natural energy of the reservoir is intended to be obtained, there is a need to use additional recovery technologies aimed at increasing its useful life, its productivity and its profitability (ROSA, 2006).

A secondary recovery method is used, such as water injection into reservoirs through injection wells, with the purpose of maintaining reservoir pressure, displacing fluid existing in the pores of the reservoir rock and filling the spaces left by the produced fluid.

Water injection into the well is one of the recovery techniques most used, and in the case of offshore wells, the injected water is seawater itself, given the ease of access and abundance. On the other hand, the reservoirs contain, in addition to oil, formation water (connate water), which is initially in balance with the oil and which tends to increase with the maturity of the fields.

The separation of produced water (formation water) from the oil occurs in the SPU. This water must be treated to be discarded, so an alternative is its reinjection into the well to supplement the pressure of the reservoir. However, reinjecting this water into the well is not sufficient to maintain the pressure necessary for oil production and sea water injection is also carried out. In this way, the mixture between formation water and seawater is inevitable, both in the reservoir and in the injection well.

The formation water found in most reservoirs have high concentrations of barium ($Ba^{2+}$), strontium ($Sr^{2+}$) and calcium ($Ca^{2+}$) ions, while seawater used in well recovery has a high concentration of sulfate ions ($SO_4^{2-}$). In this way, the mixture of these waters favors the formation of insoluble sulfates, which are deposited forming scales. In addition to sulfates, scales of calcium carbonate ($CaCO_3$) can also occur due to decay of reservoir pressure during oil production. Other types of deposits found are formed by ferrous sulfide (FeS) and ferrous hydroxide ($Fe(OH)_2$). According to Marques et al. (2001), the most common scales found in producing wells in the Campos Basin are formed by barium and strontium sulfates, with rare calcium carbonate scales.

The formation of mineral scales in producing wells and surface equipment is one of the main causes of increased operating costs and reduced oil production in oil wells (BEZERRA et al., 2013). These scales, accumulations of inorganic crystalline deposits, result from the precipitation of salts present in the water from the reservoir or production system. The precipitation of these salts occurs when their limit of solubility is reached, caused mainly by the conditions of pH, pressure, temperature or change in water composition. However, predicting such a phenomenon is still a challenge, due to the complexity of precipitation kinetics.

Scale formation may involve (MACKAY et al., 2004):
Decrease in pressure or increase in temperature of the water, leading to reduced salt solubility. The typical case is the reaction involving equilibrium between bicarbonate and calcium ions, the carbon dioxide gas and the calcium carbonate solid:

$$Ca^{2+}+2HCO_3^- \leftrightarrow CaCO_3+CO_2+H_2O$$

Mixing of incompatible waters. Occurs when seawater mixes with the formation water leading to precipitation of barium, strontium and calcium sulfates.

$$Ba^{2+}+SO_4^{2-} \rightarrow BaSO_4$$

$$Sr^{2+}+SO_4^{2-} \rightarrow SrSO_4$$

$$Ca^{2+}+SO_4^{2-} \rightarrow CaSO_4$$

Connate water+seawater→precipitation

Evaporation of saline solutions, causing reduction of solubility leading to chloride deposition:

$$NaCl(aq) \leftrightarrow NaCl(s)$$

The oil industry already has experience in problems associated with barium and strontium sulfate precipitation in offshore fields (SOUZA, A. L. S. et al. Water Management in Petrobras: Developments and Challenges. Conference: OTC—Offshore Technology Conference. Houston, Texas: Petrobras S.A., February 2005.). In these fields, seawater is generally used to displace the oil and maintain the reservoir pressure. Therefore, it is very common the occurrence of scales in these fields due to the incompatibility of mixing seawater with formation water. This way, when seawater injection starts, inside the reservoir the mixture with the connate water (formation water) occurs. As the waters generally present very different chemical compositions makes it possible to beginning scales due to supersaturation of poorly soluble salt, generally barium and strontium sulfates.

Scales occur mainly in the porous medium (reservoir), at the reservoir/producing well interface, in the production string and in the surface facilities. The reaction rate between chemical species incompatible in injection and formation waters is the main parameter that determines the intensity of scale, in cases where the reaction in the aqueous phase is far from balance. In the porous medium, this rate is highly affected by flow velocity, diffusion/dispersion and pore geometry.

The parameters that affect the formation of scales are mainly time, pH, pressure, temperature, particle size and agitation. Such factors govern the conditions of supersaturation of ions in solution, promoting nucleation. Other factors such as speed of flow, composition, surface and even temperature, impact the growth of crystals from the nuclei, and consequently, in the formation of scales.

In this regard, the squeeze method is usually applied. In short, the squeeze of scale inhibitor consists of injecting an scale inhibitor in the reservoir rock with the aim of promoting the inhibition of scale formation in the submarine production. The operation consists of positioning a volume of the inhibitor mattress inside the reservoir, where it will be adsorbed by the reservoir rock. Then, the inhibitor excess that has not been adsorbed is produced together with oil (since the inhibitor that was adsorbed by the reservoir rock is soluble in water), thus, when starting water production by the reservoir, the inhibitor will be gradually released into the BSW (basic sediments and water) water stream present in the produced oil and, thus, will promote the inhibition of scale formation in the production system.

The action of scale inhibitors can occur according to different mechanisms, one of which is the inhibition of nucleation, which involves breaking the stability thermodynamics of the nuclei by adsorption of small inhibitor concentrations through their functional groups in $BaSO_4$ nuclei. Inhibitors can also act by slowing crystal growth, when irreversible adsorption of the inhibitor occurs on the active growth sites of crystalline lattice, preventing its growth. In general, the higher molecular weight inhibitors act in this phase.

Reservoir squeeze treatments are carried out during the well production phase, upon arrival of the water. Subsequently, the formation of scale begins due to the mixing of salts from aquifer water with injected water, or to the reactive transport of water contained in the oil with the reservoir rock, as is the case with reservoirs made up of carbonates as in the pre-salt.

One of the reasons why the present invention differs from the usual method of squeeze application of inaly inhibitors lies in the fact that the composition of the present invention comprises viscous mattresses and calcite impregnated with inhibitors, with said calcite being obtained through mining of rocks which consist of calcium carbonate—whose chemical composition is not necessarily the same as that of pre-salt reservoir rock.

The present invention still has an unexpected technical effect, how to prevent inhibition already in the well construction phase, during the well drilling step. Thus, an operation that will already be carried out during drilling is used, saving the associated cost to squeeze, such as using the stimulation boat of WSSV (Well Service and Stimulation Vessels) type for carrying out the operation (which costs around R$ 9,000,000.00 of reais per operation).

It should be added that the reservoir rock of the pre-salt is between 5,000 and 6,000 meters below the sea, having a heterogeneous carbonate, that is, presenting variety in its composition, unlike carbonate calcium mined in quarries, basically consisting of calcite.

The article by Kan and collaborators (Kan et al. The state of the art in scale inhibitor squeeze treatment. Pet. Sci. 17, 1579 to 1601, 2020) reviews the parameters that influence the action mechanism of the adsorption of squeeze type, which consists of the adsorption of the inhibitor on the rock reservoir surface.

Unlike the present invention, the technique described by Kan et al. is not applied in the oil well drilling phase, but during the well production. The circulation loss control area, which aims to combat circulation loss even due to safety issues (to avoid uncontrolled well which could lead to a blowout) is carried out by the drilling project that operates in the well construction. It is important to highlight that this team does not work with adsorption techniques of inhibitors, which are commonly used in the well production in order to prevent the occurrence of scales. This squeeze process has a shelf life due to the product desorption time, requiring repetition to maintain well productivity.

Likewise, the article by Li et al. (Li, Z. et al. Comparative study of carboxylic acid adsorption on calcite: L-malic acid, D-malic acid and succinic acid. Carbonates Evaporites 34, 1131 to 1139, 2019) investigates the adsorption mechanism of carboxylic acids on the calcite surface. Regarding this document, it is worth highlighting that, within the reservoir management area there is the scale management aimed at maintaining the productivity of oil fields during their useful life.

Inside scale management two strategies are observed: inhibition of the scale formation, which aims to prevent the scale formation in the production system and removal, which aims to remove the scale to eliminate production loss associated with formation of blockages in the production equipment.

Chemical inhibition is carried out in two ways, the first being through the chemical injection of a scale inhibitor through chemical injection mandrels positioned in the production string at the depth of the interval of interest within the well. The second takes place through inhibitor squeeze operations, which are carried out through the injection of inhibitor products into the reservoir.

Chemical removal is carried out through using chemicals that will dissolve the formed scale, the chemical is specified in relation to the type of scale; for carbonates are used mineral acids such as hydrochloric acid, and organic substances such as formic and acetic acid.

For barium sulfate and/or strontium sulfate scales, in general the oil industry uses carboxylic acids to remove these scales, such as EDTA (ethylenediaminetetraacetic acid) and DTPA (diethylenetriaminepentaacetic acid).

The proposal of Li Z. et al is more focused for products that would be used as scale removers, as can be seen from the appearance of concept of "grip" for EDTA and DTPA, according to conclusion from the authors: "The adsorption of l-malic acid and d-malic acid in calcite is probably carried out by a carboxyl group and a hydroxyl, forming a "grip" on the surface, which is in line with the previous report by Gefroy et al. (1999)".

The mechanism for dissolving scales involves the formation of multiple coordinate covalent bonds between the metal ion and the complexing agent, forming complexes that are stable and soluble in water. The scales are continually dissolving as the concentration of hydrated ions in solution decreases (Li et al., 2016).

The use of complexing agents presents several advantages for dissolving salt scales poorly soluble when compared to the use of acidic solutions, highlighting the lower risks of corrosion of equipment and pipes, the absence of secondary precipitation and the effective dissolution of encrusted salts.

In this way, the work of Li Z. et al differs from the present invention mainly with regard to the objective, since the aforementioned article is aimed at studies of scale removal, which are carried out during the useful life of the well during its production, while the present invention is directed to a composition and process of scale inhibition during the well drilling phase, i.e, still in the construction step thereof.

The studies by Li and collaborators (Li, A. et al. Effects of chemical inhibitors on the scaling behaviors of calcite and the associated surface interaction mechanisms, Journal of Colloid and Interface Science, Volume 618, 2022, pages 507 to 517) are focused on interactions existing between calcite and chemical inhibitors that interfere with its precipitation and consequent scaling.

Based on the teachings of the aforementioned document, it is clear that the inhibitors tested by the Authors are used as descaling agents, i.e., destabilizing and removing the scaled material, but without actually inhibiting scale formation.

In this way, it is understood that the present invention differs from the aforementioned document, due to the fact that the objective is aimed at preparing the scaling inhibition during the well drilling phase, still in the construction step thereof. On the other hand, the aforementioned document is aimed at scale removal studies, which are carried out during the useful life of the well. Another preponderant factor in the present invention is related to the fact that the material to combat loss consists of calcite originating from quarries, which has a larger contact surface area available, much superior to reservoir rock. Such material, in the present invention, goes through a process of immersion in tanks with scale inhibitor, during time needed to adsorb as much inhibitor as possible, value which may be even higher due to the empty spaces or vugs, as well as faults, porosity and permeability of the calcite extracted from quarries.

The patent application EP 0309049 discloses a method to inhibit $CaCO_3$ scale formation by injecting composition comprising a water-soluble polymer (unsaturated carboxylic acid, unsaturated sulfonic acid), a water-soluble phosphonate and a water-soluble polymer (homopolymers of acrylic, methacrylic acids and polyacrylamides).

It is therefore concluded that the aforementioned patent application differs from the present invention in that it discloses a method to inhibit $CaCO_3$ scale formation by injecting composition comprising a water-soluble polymer, a water-soluble phosphonate, and a water-soluble polymer, whereas the present invention involves pumping mattresses to combat circulation loss, consisting of viscous mattresses (organic polymers) and calcite in different particle sizes (fine, medium and coarse).

It should also be noted that the objective of the aforementioned patent application is aimed at studies of scale removal, which are carried out during useful life of the well during its production; while the present invention is directed to preparing the inhibition of scaling during the well drilling phase, that is, still in the well construction step.

The monograph by Costa, G.N. (Study of efficiency of phosphonate groups in scaling inhibition of $CaCO_3$. Monograph (undergraduate)—Federal University of Rio Grande do Norte, Center for Exact and Earth Sciences, Institute of Chemistry, Petroleum Chemistry Course. Natal, R N, 2017, Brazil) evaluates the efficiency of inhibitors of the same chemical composition, i.e., containing phosphonate groups, in dynamic conditions.

The same document refers to inhibitors normally used for the scale inhibition in reservoir squeeze treatments that belong to several chemical classes, such as phosphonates, polycarboxylates, polyacrylates, sulfonates, corresponding acids and other hydrophilic compounds.

As can be seen once again, the document relates to the technique of inhibition during the productive life of the well, while the present invention relates to the process of immersing calcite in scale inhibitor, to be used during well drilling in operations to combat circulation loss.

In view of all of the above, no document from the state of the art when analyzed alone or together discloses a composition comprising fine, medium and coarse calcite adsorbed from scale inhibitors, along with viscous mattresses, or even the scale inhibition process when adding such composition during the drilling and construction step of the well.

Therefore, the need for development of technologies capable of preventing scale formation in oil wells, thus preventing reduction of its production and maintenance of economy from the well.

BRIEF DESCRIPTION OF THE INVENTION

The present invention describes a composition which comprises viscous mattresses, completion fluid for displacement and calcite impregnated with scale inhibitors.

More specifically, viscous mattresses are characterized by having organic polymers with a high viscosity to be able to sustain the particles of calcite during pumping and displacement of them within the formation.

The completion fluid, in its turn, seeks filling the oil well, to carry out the fluid circulation inside the well and its viscosity is equivalent to that of seawater; that is, it has a different chemical composition of the viscous mattress. Thus, the completion fluid is selected depending on the desired density. Fluids with density up to 10.0 lb/gal (0.001 kg/cm$^3$) are basically consisting of sodium chloride, for weights greater than 10.0 lb/gal (0.001 kg/cm$^3$), they consist primarily of calcium chloride, and inhibitors are selected from of sulfonates, carboxylic acids, and amides. The calcite used may have different particle sizes (fine, medium, and coarse).

In a second embodiment, the present invention relates to the process of preparing the composition, which comprises the following steps:
a) adding the inhibitor to calcite through material processing;
b) positioning the calcite in a tank where it will remain around 2 to 4 hours for the inhibitor to be adsorbed by the same;
c) drying the calcite impregnated with scale inhibitors;
d) preparing the viscous mattress in a batch mix tank; and
e) adding the inhibited calcite to the viscous mattress in the batch mix tank.

The batch mix tank used in the process refers to a tank with an agitator designed to work in offshore installations, such as a tank for agitation and mixing processes, considering an ideal geometric configuration, with a capacity of 20 to 60 bbl pumped per treatment, taking into account the maximum use of raw materials due to having a tapered base.

The addition of the inhibitor to calcite occurs in the processing of the material; that is, still at the end of the manufacturing process. After adsorption of the inhibitor by calcite, drying of the same is carried out, i.e., the removal of liquid excess from calcite. After drying, the same will be ready to be packaged and made available for supplying the composition, when mixed with the viscous mattresses and other components.

In another embodiment, the present invention discloses a process to combat circulation loss comprising the application, within the reservoir, of said composition during the drilling phase of a well.

The process described here of calcite impregnated with inhibitor aims to inhibit the scale formation in the production system due to the release of the inhibitor of calcite within the reservoir. When the water produced present in the well oil passes through calcite, which was deposited inside the reservoir during the combat operation of circulation loss, the inhibitor is released in the produced water, thus acting to prevent the deposition of calcite in the well production string.

Said scale inhibition process comprises the following steps:
a. pumping the composition containing viscous mattress with calcite impregnated with inhibitor to the production well to combat circulation loss;
b. displacing viscous mattress with inhibited calcite, with drilling fluid into the range that presents circulation loss;
c. assessing the loss flow, to verify whether the loss has been overcome; and
d. if necessary, repeating the procedure until the loss is overcome.

Therefore, the present invention aims to guarantee the chemical inhibition in producer range reservoirs, already in the drilling phase, through the addition of scale inhibitor to the loss-combating material, to prevent the scale formation during the well production step in the subsea production system, such as, for example in the well production string. This scale is capable of generating production loss, due to partial blockage of the production string, that is, the reduction in the diameter of the string in the positions where scale formation occurs.

BRIEF DESCRIPTION OF THE DRAWINGS

The present invention will be described in more detail below, with reference to the attached FIGURES which, in a schematic way and not limiting the inventive scope, represent examples of its implementation.

FIG. 1 shows the chemical preferred classes of scale inhibitors selected from the group consisting of pentaphosphonates (A), phosphinopolycarboxylate (B), polyvinylsulfonate (C), sulfonated polyacrylic copolymers (D), polyacrylates (E), a-linked polyaspartates (F), b-linked polyaspartates (G) and carboxy-methyl-inulin (H).

DETAILED DESCRIPTION OF THE INVENTION

Initially, it is worth highlighting that the following description contains preferred embodiments of the invention, without being limited by them.

The present invention relates to a composition which comprises viscous mattresses and calcite impregnated with scale inhibitors. More specifically, viscous mattresses are selected from the group of organic polymers. Preferably, said organic polymers are selected from viscosifying agents, such as, for example, xanthan gum.

Said composition of viscous mattresses comprises:
- 2.5 bbl/m of perforation, with a minimum of 60 bbl pumped per treatment.
- Antifoam from 0.05 to 0.15% v/v, preferably 0.1% v/v. The antifoam belongs to the category of polydimethylsiloxanes, fluorosilicones, polyglycols;
- Xanthan Gum as viscosifier ≥1.5 lb/bbl;
- HPA (hydroxypropyl starch) as a filter controller at 7 to 9 lb/bbl, preferably 8 lb/bbl.
- Magnesium peroxide as a breaker at a range of 0.5 to 1.5 lb/bbl, preferably 1 lb/bbl.
- completion fluid as QSP diluent for displacement and/or viscous gel.

More specifically, calcite (limestone) is used in concentrations of 15 to 25 lb/bbl, preferably 20 lb/bbl, and may present different particle sizes, such as micronized limestone (2 to 44 mm); fine limestone (2 to 74 mm), medium limestone (74 to 800 mm) and coarse limestone (800 to 5600 mm); being obtained through rock mining.

Scale inhibitors are selected from sulfonates, carboxylic acids and amides. These inhibitors belong to the chemical classes preferably selected from the group that consists of pentaphosphonates, phosphinopolycarboxylate, polyvinylsulfonate, sulfonated polyacrylic copolymers, polyacrylates, a-linked polyaspartates, b-linked polyaspartates and carboxy-methyl-inulin.

The present invention also refers to the process of preparing said composition, which comprises the following steps:
a) adding the inhibitor to calcite through material processing;
b) positioning the calcite in a tank where it will remain around 2 to 4 hours for the inhibitor to be adsorbed by the same;
c) drying the calcite impregnated with scale inhibitors;
d) preparing the viscous mattress in a batch mix tank; and
e) adding the inhibited calcite to the viscous mattress in the batch mix tank.

In step (a), the calcite remains in the tank for sufficient time for inhibitor adsorption, between 2 to 4 hours. Under these conditions, approximately 2 to 5 mL of inhibitor are adsorbed on 150 to 200 g of a calcite plug. Drying the impregnated calcite as described in step (c) can be carried out through a drying system in mats.

In step (d) where the viscous mattress is prepared 2.5 bbl are used per meter of perforation, being a minimum of 60 bbl per operation and a fine limestone mixture of (2 to 74 mm), medium limestone (74 to 800 mm), at a concentration of 15 to 25 lb/bbl each (preferably 20 lb/bbl). Coarse limestone (800 to 5600 mm) can also be used in preferred concentration of 20 lb/bbl when the previous composition does not show effectiveness in reducing the fluid loss.

Preferably, the adsorption step of inhibitor to calcite as described in step (b) can be carried out in a vacuum chamber, in accordance with the following steps:
a) placing the calcite inside the vacuum chamber;
b) promoting the vacuum inside the vacuum chamber in a range 5 to 10 mm Hg;
c) opening the supply of the inhibitor aqueous solution into the vacuum chamber;
d) waiting to complete the volume necessary to cover the calcite mass inside the vacuum chamber;
e) waiting the time necessary for the penetration of the inhibitor into the calcite for 2 to 4 hours;
f) removing excess inhibitor from inside the vacuum chamber through a conical device which separates the liquid that has not been absorbed by the calcite (like a funnel separation) or through a drying system in mats;
g) transferring the calcite to a bench for drying under NTP (normal temperature and pressure) conditions;
h) waiting for the calcite to dry: between 4 to 8 hours; and
i) promoting the bagging of dry calcite in plastic bags of 25 to 50 kg.

The use of vacuum in the impregnation of inhibitor to calcite has the main advantage of increasing the amount of scale inhibitor that can be adsorbed on the calcite, since due to the removal of air present in the empty spaces of the calcite, the inhibitor presents greater ability to penetrate calcite grains. Increasing the filling efficiency of calcite grains with the inhibitor provides a greater volume of inhibitor in the calcite within the reservoir, thus influencing the increased useful life of inhibition in wells.

It is also an object of the present invention a process to combat circulation loss comprising the application, inside the reservoir, of said composition during the well drilling phase.

Said scale inhibition process comprises the following steps:
a) pumping the composition containing viscous mattress with calcite to the production well to combat the circulation loss;
b) displacing the viscous mattress with inhibited calcite, with drilling fluid into the range that presents circulation loss;
c) assessing the loss flow, to verify whether the loss has been overcome; and
d) if necessary, repeating the procedure until the loss is overcome.

The inhibitor-impregnated calcite process aims to inhibit the scale formation in the production through the release of the calcite inhibitor within of the reservoir. When the water produced, together with the oil from the well, pass through the calcite, which was deposited within the reservoir, during the operation to combat the circulation loss, the inhibitor is released into the produced water, thus acting to prevent the deposition of calcite in the well production string.

Therefore, the present invention aims to guarantee the chemical inhibition in producer range reservoirs, already in the drilling phase.

The present invention has the following benefits:
Economic/Productivity
The present invention prevents oil production losses in the case of generating mixtures incompatible with high potential of scale formation arising from the mixture of the fluid injected into the reservoir with water from the aquifer, thus avoiding financial damages associated with production loss.

Production losses will be related with the reduction of the original flow of the well; that is, they will be the difference between the oil flow that the well can produce under normal conditions, minus the flow it will produce with scaled equipment. In this case, the cost related to production loss, added to the cost related to the need for intervention with stimulation boats, interconnected to the stationary production unit, and the stop of production to carry out the scale removal operation. It should be noted that the production loss is relative to the time the well remains stopped for scale removal operations.

The present invention further reduces the number of interventions with stimulation boat in the productive phase of oil well, resulting in savings, on average, equal to R$9 million, in addition to avoiding interventions with probes in the field development phase.

Health/Security

The present invention reduces the need for operations with stimulation boats to pump scale remove solutions of the well production string and to perform inhibitor squeeze operations. In this way, the risk associated with disconnections of the pumping system of stimulation boats and the possibility of chemical leaks into the sea is reduced.

The present invention also contributes to the maintenance of the payment of oil royalties due to promote the production maintenance, avoiding production losses.

Reliability

The present invention improves the guarantee of production flow by avoiding the early scale formation, which increases well productivity time without the need for intervention, thus avoiding production losses associated with scales.

Environmental

The present invention reduces $CO_2$ emissions due to the reduction in the need to use a vessel of WSSV type to perform scale removal operations and inhibitor squeeze.

Other Advantages

The present invention improves the scale management and thus contributes to increasing the efficiency of reservoir management in the fields in which this technology is applied.

Example

An example embodiment is in the BUZIOS field, where it is common for wells to have large volumes of circulation losses due to the use of many viscous mattresses and therefore a large mass of calcite was deposited within the reservoir. In some wells in which sizing studies were carried out scale inhibition squeeze bottle for the BUZIOS field. The predicted duration of the squeeze predicted in computational simulation, which was carried out based on laboratory, would initially take 6 months, however an example of a result above expectations was observed in a well in BUZIOS, where computer simulations pointed to a squeeze duration in the reservoir for 6 months. However, the duration of the squeeze reached 16 months. This result is well above the simulation time, is justified due to greater absorption of the product within the reservoir, which happened due to a larger open area to flow within the reservoir than the one that was foreseen in the tests with samples taken from the testimonies of the reservoir rock.

One of the unexpected technical effects that is obtained with the technology proposed in this invention is the increase of the useful life of well inhibition, which occurs due to the fact of limestone with adsorbed inhibitor, which is positioned inside the reservoir, increase the contact surface with scale inhibitor fluid, compared to rock reservoir, this increase in the contact surface leads to an increase in the amount of inhibitor made available by different granulometries of the calcite that were used in combating circulation loss, in this way, when a well has a large amount of calcite deposited within the reservoir, which increases the contact surface with the scale inhibitor which promotes absorption of a much larger volume of inhibitor and will therefore pass longer desorbing this inhibitor, this phenomenon will increase the useful life of inhibition, this is evidence that when calcite absorbs the inhibitor it is responsible for increasing the efficiency of inhibition treatment.

Those skilled in the art will value the knowledge presented here and will be able to reproduce the invention in the presented embodiments and in other variants, covered within the scope of the attached claims.

The invention claimed is:

1. A composition comprising:
    a viscous mattress comprising:
        an antifoam agent;
        xanthan gum
        hydroxypropyl starch having a concentration of 7 to 9 lb/bbl;
        magnesium peroxide having a concentration of 0.5 to 1.5 lb/bbl; and
    calcite impregnated with a scale inhibitor and suspended within the viscous mattress, wherein the calcite is present in a concentration between 15 lb/bbl to 25 lb/bbl.

2. The composition of claim 1, further comprising a completion fluid.

3. The composition of claim 2, wherein the completion fluid comprises sodium chloride, and has a density up to 10 lb/gal.

4. The composition of claim 2, wherein the completion fluid comprises calcium chloride and has a density between 10 lb/gal and 20 lb/gal.

5. The composition of claim 1, comprising 150-200 g of calcite.

6. The composition of claim 1, wherein the calcite is impregnated with 2 mL to 5 mL of scale inhibitor.

7. The composition of claim 1, wherein the calcite comprises a particle size between 2 mm to 44 mm.

8. The composition of claim 1, wherein the scale inhibitor is selected from one or more of the following groups: sulfonates, carboxylic acids, or amides.

9. The composition of claim 8, wherein the scale inhibitor is further selected from one or more of the following groups: pentaphosphonates, phosphinopolycarboxylate, polyvinylsulfonate, sulfonated polyacrylic copolymers, polyacrylates, a-linked polyaspartates, b-linked polyaspartates, or carboxy-methyl-inulin.

10. The composition of claim 1, wherein the antifoam agent comprises 0.05 to 0.15 v/v % of an agent selected from one or more of the following groups: polydimethylsiloxanes, fluorosilicones, and polyglycols.

11. The composition of claim 1, wherein the calcite comprises a particle size between 44 mm to 74 mm.

12. The composition of claim 1, wherein the calcite comprises a particle size between 74 mm to 800 mm.

13. The composition of claim 1, wherein the calcite comprises a particle size between 800 mm to 5600 mm.

14. A composition comprising:
    a viscous mattress comprising:
        an antifoam agent;
        xanthan gum hydroxypropyl starch having a concentration of 7 to 9 lb/bbl;
magnesium peroxide having a concentration of 0.5 to 1.5 lb/bbl; and
calcite impregnated with a scale inhibitor and suspended within the viscous mattress, wherein the calcite is present in a concentration between 15 lb/bbl to 25 lb/bbl, and wherein the scale inhibitor is selected from one or more of the following groups: phosphinopolycarboxylate, sulfonated polyacrylic copolymers, a-linked polyaspartates, b-linked polyaspartates, or carboxy-methyl-inulin.

* * * * *